July 15, 1958  H. B. PETERSON ET AL  2,843,253
MECHANISM FOR ARRANGING SIDE SEAMS OF CANS
Filed March 19, 1956  3 Sheets-Sheet 2
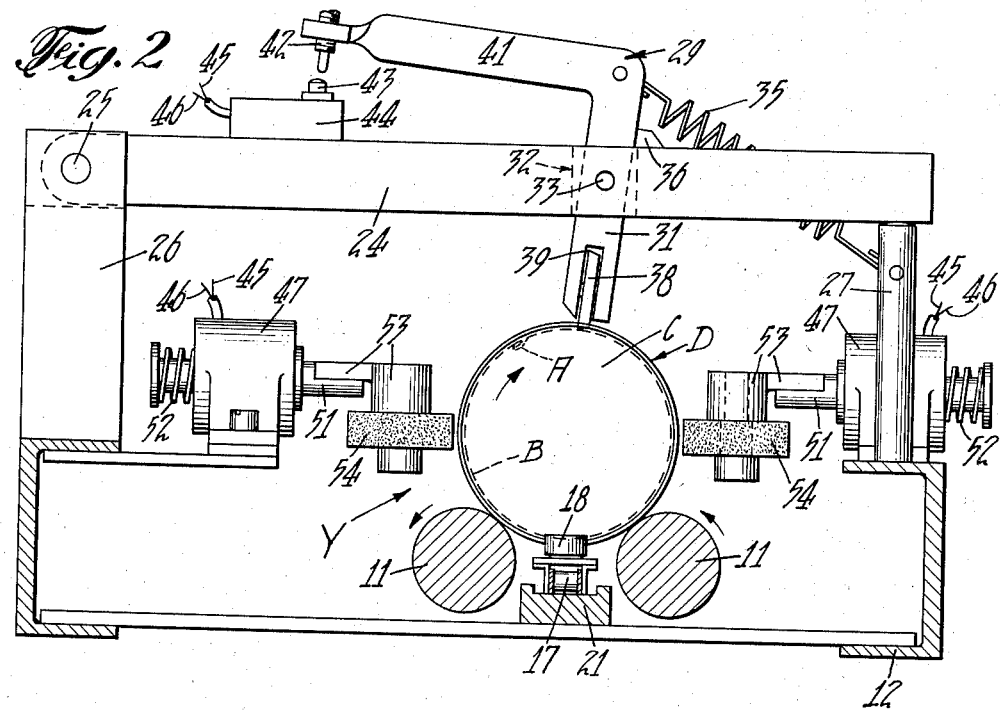
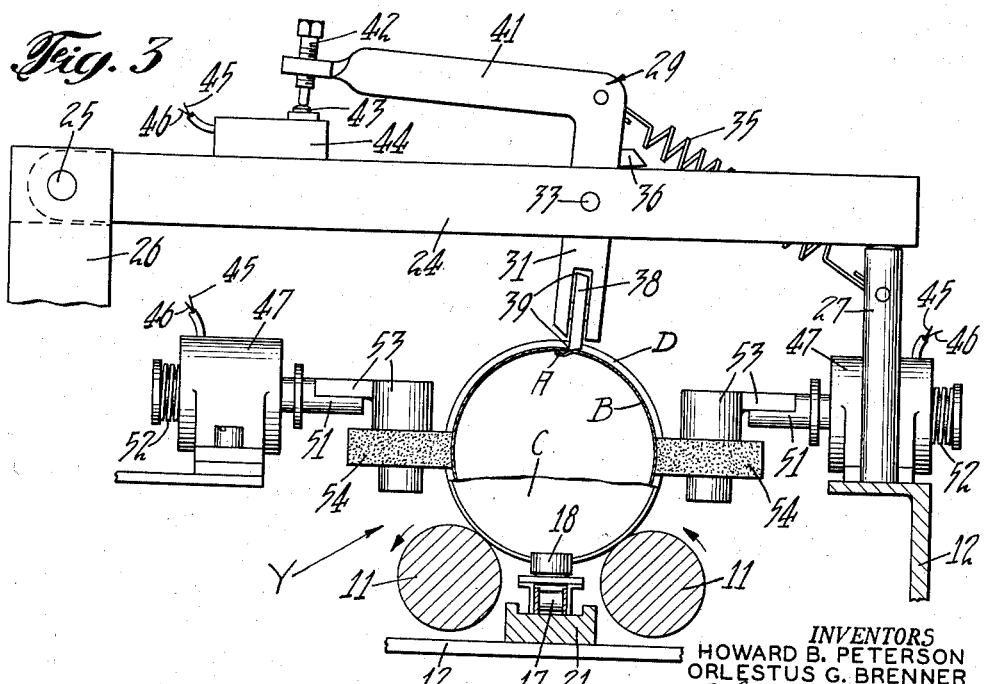
INVENTORS
HOWARD B. PETERSON
ORLESTUS G. BRENNER
BY Charles H. Erne
Leland R. McCann
George W. Reiber
ATTORNEYS

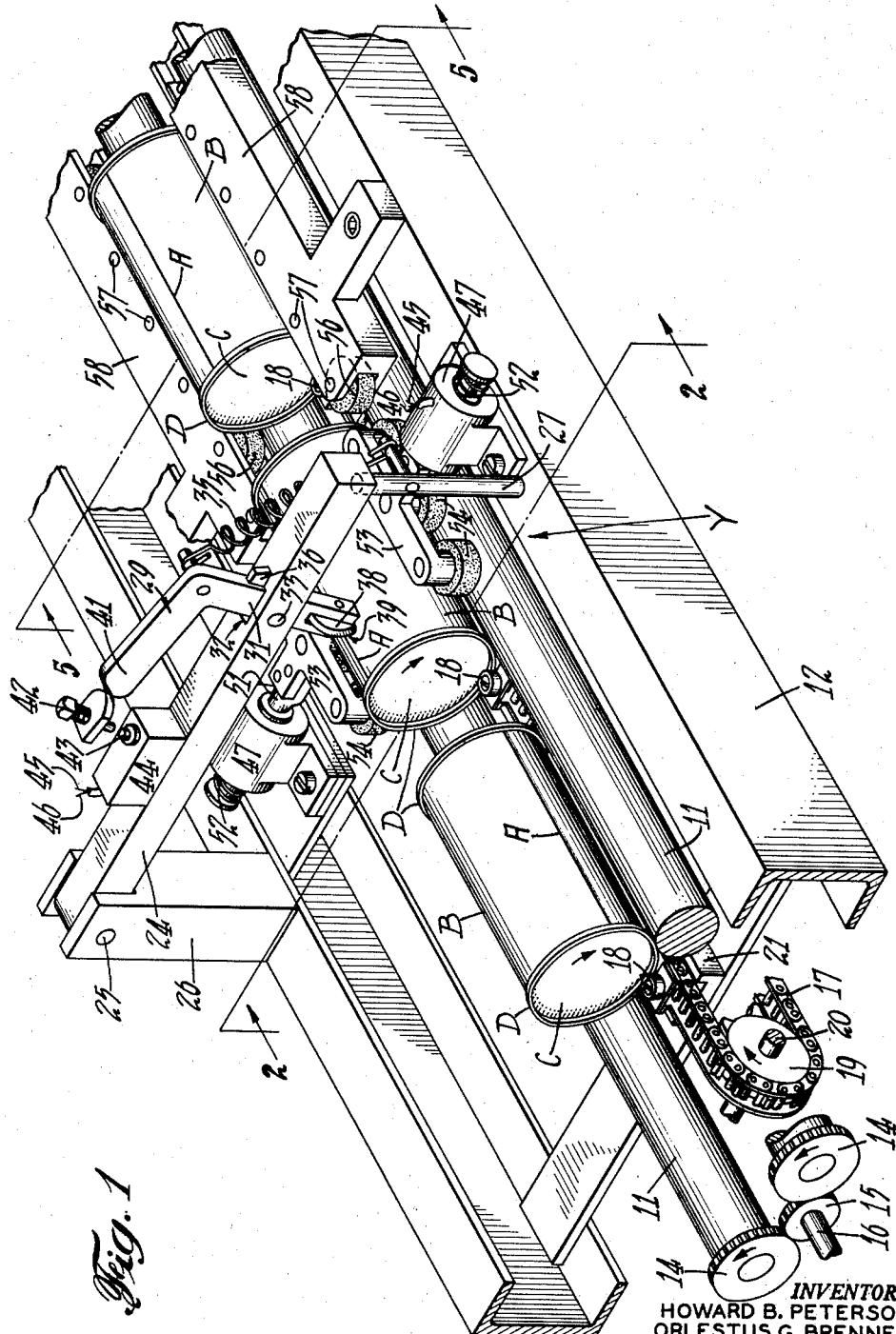
INVENTORS
HOWARD B. PETERSON
ORLESTUS G. BRENNER
BY
ATTORNEYS

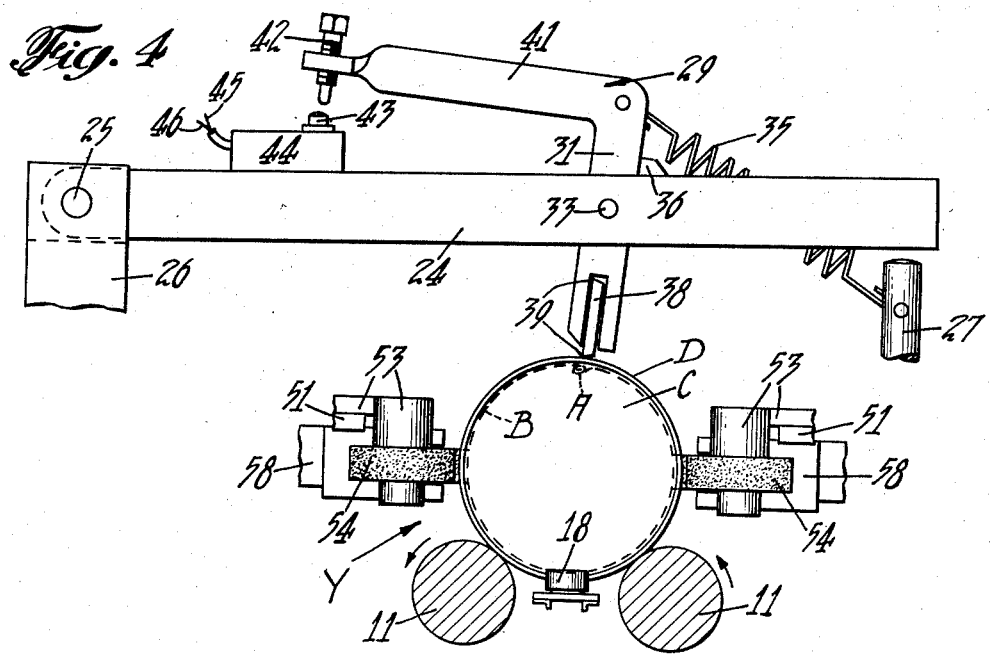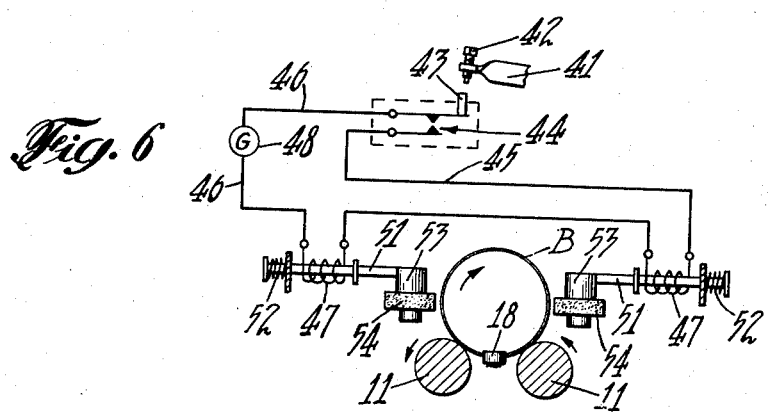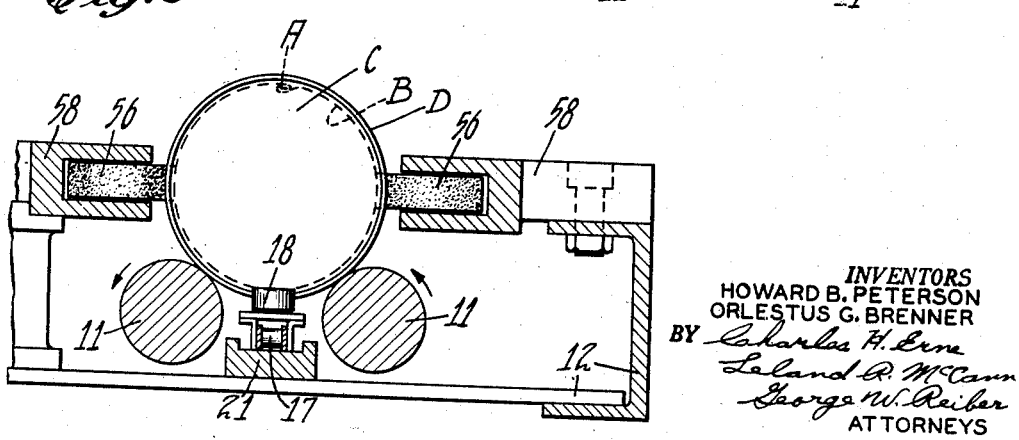

United States Patent Office 2,843,253
Patented July 15, 1958

2,843,253
MECHANISM FOR ARRANGING SIDE SEAMS OF CANS

Howard B. Peterson, San Francisco, and Orlestus G. Brenner, San Bruno, Calif., assignors to American Can Company, New York, N. Y., a corporation of New Jersey Application March 19, 1956, Serial No. 572,356

9 Claims. (Cl. 198—33)

The present invention relates to machines for feeding cans or can bodies along a path of travel for treatment and has particular reference to mechanism for arranging the side seams of the cans or can bodies in a predetermined line of travel for treatment.

An object of the invention is the provision of a mechanism for aligning the side seams of cans or can bodies entering a machine for operations to be performed thereon, so that the aligned seams will be located in a predetermined position relative to the working parts of the machine during the operations.

Another object is the provision of such a mechanism which aligns the seams in a predetermined line of travel while the cans or can bodies are moving so that the cans or can bodies may be fed into the machine in spaced and timed processional order.

Another object is the provision of such a mechanism which is particularly adapted to the use of mechanical aligning members which are arranged to align the seams and maintain them in alignment during advancement.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a mechanism embodying the instant invention, with parts broken away and with cans or containers shown in place in the mechanism;

Figs. 2, 3 and 4 are enlarged sectional views taken substantially along a plane indicated by the lines 2—2 in Fig. 1, the views showing certain of the movable parts in different positions;

Fig. 5 is an enlarged sectional view taken substantially along a plane indicated by the lines 5—5 in Fig. 1; and Fig. 6 is a schematic view illustrating principal parts of the mechanism and a wiring diagram of the electric apparatus used in the mechanism.

As a preferred or exemplary embodiment of the instant invention, the drawings illustrate a mechanism for longitudinally aligning side seams A (Fig. 1) of sheet metal cylindrical cans B, advancing in endwise relation along a predetermined path of travel in spaced and timed processional order. The cans B preferably are fitted with end members C secured to their bodies in any suitable manner such as end seams D. However the invention is equally well adapted to the aligning of side seams of can bodies or seams of other cylindrical articles.

The cans B while traveling in endwise relation are supported on a pair of spaced and parallel, continuously rotating, horizontally disposed, longitudinal bar rollers 11 which are journaled in any suitable manner in bearings attached to a frame 12 which may be a subframe of a more elaborate machine. The rollers 11 are rotated in unison and in the same direction by spur gears 14 which are carried on one end of the rollers and which mesh with and are driven by a driving gear 15. The gear 15 is mounted on a drive shaft 16 which may be rotated in any suitable manner. The cans B supported on the bar rollers 11 are thus rotated on their own axes at a predetermined speed in accordance with the speed of rotation of the drive gear 15.

While so rotated, the cans B are advanced endwise along the bar rollers 11 preferably by an endless chain conveyor 17, the upper run of which is horizontally disposed and extends the length of the rollers 11 in the space between them. The conveyor 17 carries roller feed dogs 18 located at spaced intervals for engagement behind the cans to propel the latter along the rollers 11 in spaced and timed processional order. The conveyor 17 operates over a pair of sprockets 19 disposed at opposite ends of the mechanism and mounted on shafts 20 journaled in suitable bearings attached to the frame 12. One of the shafts 20 is a drive shaft and is rotated in any suitable manner and in the proper direction to propel the cans B along the bar rollers 11 (toward the right as viewed in Fig. 1). The upper run of the conveyor 17 operates in a guide track 21 to support the conveyor between its sprockets and to guide it in a straight line between the bar rollers 11.

During its advancement along the bar rollers 11, the rotating can B passes through a seam aligning station Y (Figs. 1, 2, 3, 4, and 6). At this station Y, the rotating can B advances under a horizontal bridge 24 which extends transversely of the path of travel of the cams. One end of the bridge 24 is mounted on a pivot pin 25 carried in an upright boss 26 which extends up from the frame 12. The opposite end of the bridge freely rests on the upper end of a support pin 27 which extends up from the frame 12.

The bridge 24 carries a seam detecting and aligning bell crank 29 having a substantially vertical arm 31 which extends down through an opening 32 in the bridge. The opening 32 is located over the path of travel of the cans B. Intermediate its ends, the arm 31 is mounted on a pivot pin 33 which is secured in the bridge 24 and extends across the opening 32 to pivotally carry the arm in the opening.

The arm 31 is yieldably held in a slightly angular position, radial with the path of travel of the axes of the moving cans B, by a coiled tension spring 35 having one end connected to the upper end of the arm 31 and its opposite end fastened to the support pin 27. A stop lug 36 on the upper portion of the arm 31 engages against the top of the bridge 24 to locate the arm in its angular position. The spring 35 thus yieldably holds the arm 31 in position and also holds the free end of the bridge 24 in contact with its support pin 27.

At its lower end, the arm 31 carries a seam aligning roller 38 which is mounted for frictional engagement with and for rotation on the outer surface of the can body along its length as the body advances through the aligning station Y. The outer periphery of the roller 38 is tapered so as to provide a sharp peripheral edge 39 on the side which the body side seam A rotates toward, i. e. on the left as viewed in the drawings, so that as the side seam rotates toward the aligning roller 38, it engages laterally against the side of the roller having the sharp edge 39.

In operation, a can body B moving into the aligning station Y engages its leading end seam D against the periphery of the aligning roller 38 and thus slightly raises the roller and the bridge 24 to which it is connected, to permit the roller to ride over the end seam D as shown in Fig. 4 and to then engage against the outer face of the body as shown in Figs. 2 and 3. As the body continues to advance, the roller 38 rolls along the length of the body. During this advancement the body is also being rotated on its axis by the bar rollers 11. Hence at some time during this combined body rotation and advancement, the body side seam A engages the aligning roller 38 laterally as shown in Fig. 3 and this stops further rotation of the body and thus locates the side seam in a predetermined line of travel.

The stopping of the rotation of the body B by the aligning roller 38 sets in operation certain elements which clamp against the sides of the body before the roller 38 reaches and rides over the trailing end seam D. These elements hold the body against further rotation so that the side seam will be held in its located position but permits the body to continue its advancement along its path of travel. For this purpose, the bell crank 29, at the upper end of the aligning arm 31 is formed with a substantially horizontal arm 41 which at its outer free end carries an adjustable switch actuating screw 42. The lower end of the screw 42 normally is disposed in spaced relation to a movable element 43 of a normally open electric switch 44 mounted on the bridge 24.

The electric switch 44 is connected by wires 45, 46 (Fig. 6) to a pair of electric solenoids 47 disposed at the aligning station Y adjacent the path of the can body and located one on each side of the moving bodies. The wires 45, 46 are connected to a suitable source of electric current such as a generator 48. The solenoids 47 are provided with movable cores 51 (see also Figs. 1, 2 and 3) which at their outer ends are surrounded by compression springs 52 which urge the cores outwardly away from the path of travel of the can body. At their inner ends, the cores 51 carry elongated brackets 53 which extend along the path of travel of the can body and which carry a plurality of depending horizontally disposed and longitudinally aligned pressure rollers 54.

When the side seam A on the rotating and advancing can body at the aligning station Y engages and is stopped in proper alignment by the aligning roller 38 as explained above, the seam presses against the roller 38 and rocks the aligning arm 31 and its integral arm 41 so as to move the actuating screw 42 into engagement with the electric switch element 43 as shown in Fig. 3. This closes the electric switch 44 and thus establishes an electric circuit along which current from the generator 48 flows to and through the solenoids 47 to energize them. The energizing of these solenoids thrusts their movable cores toward each other and thus clamps the pressure rollers 54 against the sides of the can body to hold the body between them against rotation without retarding the longitudinal advancement of the body.

As the can body B, with its properly located side seam A, moves out of the aligning station Y, it advances between a plurality of oppositely disposed holding rollers 56 which are disposed along the path of travel of the can body beyond the aligning station Y, to prevent rotation of the body and thus hold the seam in its predetermined location until it is utilized for an operation in the machine into which the body is fed. These holding rollers 56 (Figs. 1 and 5) are disposed in a horizontal, longitudinally aligned position and are rotatably mounted on pins 57 carried in elongated brackets 58 which extend along the path of travel of the can body. The brackets 58 are secured to the frame 12.

As the can body B advances from the clamping rollers 54 to the holding rollers 56, the aligning roller 38 rides over the trailing end seam D of the body and thus leaves the body. This action causes the spring 35 to lift the switch actuating screw 42 from the electric switch 44 and thus opens the switch. This breaks the circuit and deenergizes the solenoids 47 with the result that their holding springs 52 draw the clamping rollers 54 away from the outgoing can body and position them in the clear for the next incoming body in the procession being advanced by the conveyor 17. This completes the cycle of operation of the mechanism.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A mechanism for arranging the side seams of can bodies in a predetermined line of travel, comprising in combination means for advancing a can body in an endwise direction, means for rotating said can body on its axis during its advancement, seam detector means disposed adjacent the path of travel of said body and engageable against the surface of said body for detecting its side seam when said seam reaches a predetermined line of travel, clamp means disposed adjacent the path of travel of said can body and operable by said detector means for arresting further rotation of said body to retain said seam in said predetermined line of travel, and means for receiving said can body from said clamping means and for retaining its side seam in said predetermined line of travel during further advancement of the body.

2. The combination defined in claim 1 wherein said receiving means is a plurality of rollers disposed adjacent opposed sides of the path of travel of said can body and are engageable against the sides of the advancing body to confine it against rotation.

3. A mechanism for arranging the side seams of can bodies in a predetermined line of travel, comprising in combination means for advancing a can body in an endwise direction, means for rotating said can body on its axis during its advancement, a seam detector including a roller mounted for rolling action along the length of said advancing can body and over any projections thereon, said roller having a peripheral edge engageable laterally against said side seam for detecting said seam when it reaches a predetermined line of travel, and clamp means disposed adjacent the path of travel of said can bodies and operable by said detector means for arresting further rotation of each body to retain said seam in said predetermined line of travel.

4. The combination defined in claim 1 wherein said clamp means is at least one member on each side of the path of travel of said can body adjacent said seam detector means and wherein there is provided actuating means for moving said members toward each other to clamp said can body between them.

5. The combination defined in claim 4 wherein said members are rollers.

6. The combination defined in claim 4 wherein said acutuating means comprises electric solenoids electrically connected with said seam detector means for operation by said detector means.

7. The combination defined in claim 3 wherein said roller mounting is a pivoted arm yieldably disposed at an angle to the path of travel of said can body and wherein there is provided means operable by said arm and connected with said clamp means for actuating the latter.

8. The combination defined in claim 7 wherein said means operable by said arm is an electric switch.

9. A mechanism for arranging the side seams of can bodies in a predetermined line of travel, comprising in combination means for advancing a can body in an endwise direction, means for rotating said can body on its axis during its advancement, seam detector means disposed adjacent the path of travel of said body and engageable against the surface of said can body for detecting its side seam when said seam reaches a predetermined line of travel, a clamp disposed adjacent the path of travel of said can bodies and comprising rollers mounted adjacent said path of the can bodies for free rotation in the direction of movement of said bodies and for reciprocation toward and from said bodies, and actuating means operable by said detector means for reciprocating said clamp rollers toward and from said path of travel of the can body, whereby upon operation of said clamp by said detector means said rollers engage and arrest further rotation of said body to retain its seam in said predetermined line of travel while said body advances between and in engagement with said rollers.

References Cited in the file of this patent

UNITED STATES PATENTS 2,140,246     O'Neil _____ Dec. 13, 1938